United States Patent [19]

Kondo et al.

[11] Patent Number: 5,271,976
[45] Date of Patent: Dec. 21, 1993

[54] BIAXIALLY STRETCHED MULTILAYER FILM AND PROCESS FOR MANUFACTURING SAME

[75] Inventors: Kazuo Kondo; Nobuya Ishiguro, both of Marugame; Toyoki Wano, Zentsuuji; Teruo Tada, Marugame; Teruaki Yoshida, Ichihara, all of Japan

[73] Assignees: Okura Industrial Co., Ltd.; Sumitomo Chemical Company, Limited, both of Japan

[21] Appl. No.: 687,686

[22] Filed: Apr. 19, 1991

[30] Foreign Application Priority Data

Apr. 27, 1990 [JP] Japan ................... 2-111948

[51] Int. Cl.$^5$ .............. B32B 1/08; B29D 22/00; D01D 5/24
[52] U.S. Cl. ................... 428/35.2; 428/35.2; 428/34.9; 428/36.5; 428/36.7; 428/35.4; 428/331; 428/332; 428/340; 428/402; 428/402.24; 428/403; 428/516; 428/517; 428/518; 428/327; 428/328
[58] Field of Search ............ 428/35.2, 36.5, 331, 428/332, 340, 402, 402.24, 520, 34.9, 36.7, 516, 518, 515, 517, 910, 403, 407, 327, 328, 35.7, 35.9, 36.91

[56] References Cited

U.S. PATENT DOCUMENTS 5,082,744  1/1992  Akao ....................... 428/522
5,110,671  5/1992  Balloni et al. ............ 428/218

FOREIGN PATENT DOCUMENTS 0004633  10/1979  European Pat. Off. .
0124310  11/1984  European Pat. Off. .
0242055  10/1987  European Pat. Off. .
0361280   4/1990  European Pat. Off. .
2124972   2/1984  United Kingdom .

*Primary Examiner*—Ellis P. Robinson
*Assistant Examiner*—Charles R. Nold
*Attorney, Agent, or Firm*—Lorusso & Loud

[57] ABSTRACT

A tubular multilayer film including at least two, biaxially stretched tubular layers each formed of a polypropylene resin, wherein the innermost layer contains spherical antiblocking agent particles having an average particle size of 0.2 to 5 $\mu$m in an amount of 0.1 to 0.7% by weight, and the outermost layer is free of the spherical antiblocking agent particles is disclosed. The multilayer film may be prepared by biaxially stretching a multilayer tubular raw sheet having an innermost polypropylene layer containing spherical antiblocking agent particles and an outermost polypropylene layer free of such antiblocking agent particles.

20 Claims, No Drawings

BIAXIALLY STRETCHED MULTILAYER FILM AND PROCESS FOR MANUFACTURING SAME

BACKGROUND OF THE INVENTION

This invention relates to a biaxially stretched, tubular multilayer film which is constituted by two or more layers and in which both surface layers are of a polypropylene resin. More particularly, the present invention relates to a biaxially stretched, tubular multilayer film having both good transparency and good lubricating properties produced by the inflation biaxially stretching method using spherical antiblocking agent particles. The multilayer may be, for example, a 2-layer biaxially stretched film wherein the two layers comprise a polypropylene resin, a 3-layer biaxially stretched film which comprises a core polyethylene resin layer sandwitched between two polypropylene resin layers, and a 5-layer biaxially stretched film which is constituted by two surface layers composed of polypropylene resin, a core layer composed of a saponified product of ethylene/vinyl acetate copolymer, and two interlayers composed of an adhesive resin such as a propylene-butene-1 copolymer respectively provided between the surface layers and the core layer. The present invention is also directed to a method for manufacturing a tubular multilayer film having the above-described constitution.

Stretched films comprising a polypropylene resin are in wide use for packaging. Particularly, multilayer polypropylene stretched films wherein the two surface layers are formed of a polypropylene resin are important because of their excellent properties.

Such stretched films are required to be excellent in lubricating properties in view of adaptability to packaging machines and of lubrication be packaged articles as well as in transparency. This requirement has been satisfied by adding an antiblocking agent together with a lubricant to the whole film, to a single layer film or to a surface layer of a multilayer film. As such antiblocking agents, inorganic silica materials of amorphous and porous form have been used. However, these antiblocking agents seriously decrease transparency when added in an amount sufficient to obtain sufficient lubricating properties, and thus the resulting films are not suitable for packaging use.

Recently, spherical antiblocking agent particles composed of a silicone resin or a non-porous inorganic material have come into use. For example, Japanese Patent Publication Nos. 62-215646, 62-232448, 62-233248 and 1-135840 describe the use of silicone resin fine particles. These antiblocking agents are known to provide good lubricating properties without seriously spoiling the transparency of the films. In case of obtaining a biaxially stretched film by an inflation biaxial stretching method using these antiblocking agents, however, any fold of the unstretched raw sheet formed upon manufacture thereof by a pair of pinch rolls, remains as a white line, unfavorable to use as packaging film. Particularly, with packaging films most of which are heat-shrinkable, the white line mark remains distinct after heat shrinkage, which is unfavorable to use as packaging films.

SUMMARY OF THE INVENTION

It is an object of the present invention to provide a multilayer, biaxially stretched film containing spherical antiblocking agent particles, which is free of a white line mark which would otherwise be formed upon passage of the unstretched sheet between a pair of pinch rolls.

Another object of the present invention is to provide multilayer polypropylene, biaxially stretched films having good lubricating properties and good transparency required of packaging films.

In accomplishing the foregoing objects there is provided in accordance with one aspect of the present invention a tubular multilayer film comprising at least two, biaxially stretched tubular layers each formed of a polypropylene resin, wherein the innermost layer contains spherical antiblocking agent particles having an average particle size of 0.2 to 5 $\mu$m in an amount of 0.1 to 0.7% by weight, and the outermost layer is free of said spherical antiblocking agent particles.

In another aspect, the present invention provides a process a process for manufacturing a biaxially stretched multilayer film, which comprises extruding a multilayer tubular raw sheet wherein the innermost layer comprising a polypropylene resin has a thickness of up to 50% based on the total thickness of the tubular sheet and contains spherical antiblocking agent particles having an average particle size of 0.2 to 5 $\mu$m in an amount of 0.1 to 0.7% by weight and the outermost layer comprising a polypropylene resin does not contain said spherical antiblocking agent particles, and subjecting the extruded multilayer tubular raw sheet taken up by a pair of pinch rolls to inflation biaxial stretching.

The polypropylene resin to be used for forming the outermost and the innermost layers may be, for example, a propylene homopolymer, an ethylene-propylene copolymer or an ethylene-propylene-butene-1 terpolymer. A core layer may be interposed between the outermost and innermost layers. Such a core layer may be formed of a polyethylene resin such as a saponified ethylene-vinyl acetate copolymer or a low density polyethylene having a density of 0.924 g/cm$^3$ or less, preferably a linear low density polyethylene having a density of 0.910 g/cm$^3$ or less. Between each of the outermost and innermost layers and the core layer, there may be disposed an adhesive layer formed, for example, of a propylene-butene-1 copolymer.

If the spherical antiblocking agent particles to be used in the present invention are added to a single-layer stretched film composed of a polypropylene resin or to both surface layers (composed of a polypropylene resin) of a multilayer polypropylene, stretched film, the fold formed in the unstretched raw sheet upon passing between a pair of pinch rolls will remain as a white line mark after inflation biaxial stretching. In order to elucidate the cause of the formation of a white line mark, the white line mark and the rest of the film were studied through electron microscopic photographs thereof. As a result, it is revealed that the antiblocking agent particles located in the white line mark are apart from the matrix of polypropylene resin, forming large disk-like voids. The voids are found to be formed only on the outer side of the unstretched tube. This may be attributed to that, upon formation of the fold due to passage of the tube between a pair of pinch rolls, the antiblocking agent particles are removed from the matrix polypropylene and leave voids, due to tensile tension applied thereto upon biaxial stretching. An assembly of the voids whitens the film to form the white line mark. Additionally, the mechanism of formation of voids on the inner side of the unstretched raw sheet may be considered as follows. That is, the outer side of the unstretched tubular raw sheet is in a somewhat stretched state at a low temperature upon passing between a pair of pinch rolls and, at this moment, the antiblocking agent particles contained therein become apart from the matrix of polypropylene resin. On the other hand, the inner side of the unstretched tubular sheet is in a pressed state upon passing between a pair of pinch rolls and, therefore, the antiblocking agent particles do not separate from the matrix of polypropylene resin.

Additionally, conventionally widely used antiblocking agents composed of porous inorganic particles seemingly do not separate from the matrix propylene resin upon passing between a pair of pinch rolls due to their excellent adhesion to the polypropylene resin owing to their anchoring effect. Hence, a fold will not show as a white line mark after biaxial stretching of the unstretched raw sheet.

In a stretching process, the polypropylene resin is easily stretched since it is in a heated state, and hence the antiblocking agent particles supposedly do not separate from the matrix of polypropylene resin.

With the above findings in mind, the inventors have found a process of adding the above-described spherical antiblocking agent particles only to the propylene resin layer on the inner side of the unstretched tubular sheet and not to the propylene resin layer on the outer side thereof. Additionally, it suffices in many cases for packaging films to possess sufficient lubricating properties only on one side thereof.

Other objects, features and advantages of the present invention will become apparent from the detailed description of the preferred embodiments of the present invention to follow.

DETAILED DESCRIPTION OF THE PREFERRED EMBODIMENTS OF THE INVENTION

Firstly, the extruding process for preparing the tubular multilayer unstretched raw sheet and the subsequent inflation biaxial stretching process are described. A tubular unstretched multilayer sheet having two or more layers wherein both the outermost layer and the innermost layer are composed of polypropylene resin is prepared by extrusion using two or more extruders and a circular die for forming a tube having two or more layers, with said innermost layer containing the spherical antiblocking agent particles and said outermost layer not containing them. The thus-obtained tubular sheet is taken up in a flat state between a pair of pinch rolls. In this situation, it is preferred to quench the tubular sheet immediately after extrusion by water or the like for the purpose of improving stretching properties of the sheet in the subsequent inflation biaxial stretching process.

The thus-obtained tubular multilayer unstretched raw sheet is subjected to simultaneous biaxial stretching in a conventional manner using two pairs of pinch rolls different in peripheral speed and using a pressurized gas. For general packing use, the resulting biaxially stretched film is then heat-set for removing its heat-shrinking properties. On the other hand, for heat-shrinking use, the resulting film is preferably subjected to a thermal treatment to such a degree that it loses shrinking properties at room temperature without diminishing its heat-shrinking properties. Additionally, stretching according to the inflation technique is particularly preferable for manufacturing the heat-shrinking film since it enables one to easily impart uniform heat-shrinking properties in the longitudinal direction and the transverse direction.

The spherical antiblocking agent particles used in the present invention are required to be non-porous and in a spherical form of 0.2 to 5 μm in average particle size. If the average particle size is less than 0.2 μm, the blocking agent particles fail to give enough lubrication to serve as packaging film. On the other hand, if more than 5 μm, transparency becomes deteriorated too much for the film to be used as packaging film. As to the form of the spherical antiblocking agent particles, they are preferably 1.0 to 1.2 in sphericity. The term "sphericity" as used herein means the ratio of A/B wherein A is a longitudinal diameter of the spherical particle measured under an electron microscope, and B a transverse diameter.

The spherical antiblocking agent particles have preferably a specific surface area of up to 120 m$^2$/g. If the specific surface area exceeds 120 m$^2$/g, there sometimes result insufficient lubricating properties for packaging use.

Specific examples of the spherical antiblocking agent particles to be used in the present invention are illustrated below. For example, silicone resin particles having a network structure wherein siloxane bonds extend three-dimensionally, and non-porous inorganic fine particles are preferably used. As the inorganic fine particles, amorphous aluminoslicate ($SiO_2/Al_2O_3 = 3-4$) particles are preferred. Such inorganic particles are more preferably surface-treated with a coupling agent for improving adhesion to the polypropylene resin. As the coupling agents silane coupling agents or titanium coupling agents may be used, with silane coupling agents being particularly preferred and vinylsilane coupling agents being more particularly preferred.

The spherical antiblocking agent particles must be added to the innermost layer of the tubular multilayer polypropylene biaxially stretched film in a content of 0.1 to 0.7% by weight. If the content is less than 0.1% by weight, there results films with only insufficient lubricating properties, whereas if more than 0.7% by weight, even the spherical antiblocking agent particles deteriorate the transparency of the film, and such amounts are thus unsuitable for providing packaging films. Additionally, the innermost layer may contain conventional porous inorganic antiblocking agent particles used together with the spherical antiblocking agent particles.

It must be noted in the present invention that the above-described spherical antiblocking agent particles should not be added to the outermost layer of the multilayer polypropylene biaxially stretched tubular film. In cases where both surfaces of the film are required to possess good lubricating properties at any cost, conventional porous inorganic antiblocking agent particles may be added to the outermost layer of the tubular film.

Additionally, conventionally widely used lubricants such as oleic amide, erucic amide and ethylenebis-stearic, amide may optionally be added to both surface layers or to one surface layer of the multilayer polypropylene biaxially stretched film.

The innermost layer of the multilayer polypropylene biaxially stretched tubular film is required to account for up to 50% of the total thickness of the film. If more than 50%, a white line mark will form upon being passed between a pair of pinch rolls in the manufacturing process.

The present invention is now described in more detail by reference to the following Examples and Comparative Examples.

In the present invention, transparency, specific surface area, lubricating property are evaluated as follows:

Transparency ... evaluated in terms of haze measured according to ASTM-D-1003;

Specific surface area ... measured according to BET method by nitrogen ($N_2$) adsorption at liquid nitrogen temperature; Lubricating property ... evaluated by a coefficient of dynamic friction (CO-DF) measured according to ASTM-D-1894.

EXAMPLE 1

A tubular multilayer raw sheet was formed by extrusion through a circular die for co-extrusion, said sheet comprising an inner layer of a polypropylene resin composition containing spherical silicone resin fine particles of 0.5 μm in particle size, 70 m²/g in specific surface area, and about 1 in sphericity in the amount of 0.25% by weight and an outer layer not containing the above-described silicone resin particles. Then, the extruded sheet was taken up in a flat state by passing between a pair of pinch rolls. Additionally, the two layers contained an amide lubricant in the amount of 0.05% by weight, respectively.

The thus-obtained multilayer unstretched raw sheet had a total thickness of about 450 μm, with the thickness ratio of the inner layer to the outer layer being 1:2. The co-extruded tubular multilayer raw sheet was quenched in a conventional manner using water.

This multilayer unstretched raw sheet was subjected to biaxial stretching in a conventional inflation manner with a stretch ratio of 4.5 times in both longitudinal and transverse directions to obtain a multilayer biaxially stretched film. This multilayer stretched film was then heat-set in a loosened state. Thus, there was obtained a multilayer polypropylene biaxially stretched film of about 20 μm in total thickness.

The thus-obtained multilayer polypropylene biaxially stretched film showed no detectable fold mark which would otherwise be formed upon being passed between a pair of pinch rolls in its manufacture process. In addition, the unstretched raw sheet to be subjected to the inflation process showed a coefficient of dynamic friction of 0.35 on the inner side thereof, showing sufficient lubrication to serve as packaging film. The biaxially stretched film had a haze of 2.3, thus showing a good transparency.

EXAMPLE 2

A three-layer unstretched raw sheet was formed by extrusion through a circular die for co-extrusion of three layers using three extruders, said sheet comprising an innermost layer of an ethylene/propylene copolymer of 138° C. in melting point containing spherical silicone resin fine particles of 0.5 μm in particle size, 70 m²/g in specific surface area, and about 1 in sphericity in the amount of 0.35% by weight and an outermost layer of the above-described ethylene-polyethylene copolymer which did not contain the above-described silicone resin particles, and a core layer therebetween of linear low-density polyethylene resin of 0.900 g/cm³ in density and 67° C. in Vicat softening point not containing the above-described spherical silicone resin fine particles. Then, the extruded sheet was taken up in a flat state by passing between a pair of pinch rolls. Additionally, the two surface layers contained an amide lubricant in the amount of 0.08% by weight, respectively.

The thus-obtained multilayer unstretched raw sheet had a total thickness of about 260 μm, with the thickness ratio being 1:3:1. Additionally, the co-extruded tubular multilayer raw sheet was quenched upon extrusion molding in a conventional manner using water as in Example 1.

This multilayer unstretched raw sheet was subjected to the simultaneous biaxial stretching process in a stretch ratio of 3.8 in both longitudinal and transverse directions to obtain a multilayer biaxially stretched film. This stretched film was subjected to heat treatment in a loosened state for the purpose of eliminating shrinking at room temperature. Thus, there was obtained a multilayer polypropylene biaxially stretched film having a total thickness of about 15 μm.

The thus-obtained multilayer polypropylene biaxially stretched film showed no detectable fold mark which would otherwise be formed upon being passed between a pair of pinch rolls in its manufacture process. In addition, the unstretched raw sheet to be subjected to the inflation process showed a coefficient of dynamic friction of 0.19 on the inner side thereof, showing sufficient lubrication to serve as heat-shrinkable packaging film. The biaxially stretched film had a haze of 3.2, thus showing a good transparency as a heat-shrinkable packaging film.

EXAMPLE 3

A multilayer polypropylene biaxially stretched film having a total thickness of 20 μm was obtained in the same manner as in Example 1 except for using, as inorganic spherical antiblocking agent particles, spherical amorphous aluminosilicate ($SiO_2/Al_2O_3 = 3.6$) of 2 μm in average particle size and 18 m²/g in specific surface area having been surface-treated with a vinylsilane coupling agent in the amount of 0.3% by weight, in place of the spherical silicone resin particles.

The thus-obtained multilayer polypropylene biaxially stretched film showed, as in Example 1, no detectable fold mark which would otherwise be formed upon being passed between a pair of pinch rolls in its manufacture process. In addition, the unstretched raw sheet to be subjected to the inflation process showed a coefficient of dynamic friction of 0.41 on the inner side thereof, showing sufficient lubrication to serve as packaging film. The biaxially stretched film had a haze of 3.7, thus showing a good transparency as a packaging film.

COMPARATIVE EXAMPLE 1

A multilayer polypropylene biaxially stretched film was obtained in the same manner as in Example 1 except for using amorphous silica porous particles of 300 m²/g in specific surface area in place of the spherical silicone resin particles added to the inner layer of the tubular sheet in Example 1.

The thus-obtained multilayer polypropylene biaxially stretched film showed no detectable fold mark which would otherwise be formed upon being passed between a pair of pinch rolls in its manufacture process. However, the resulting film had a poor haze of 5.8, thus being inferior in transparency. In addition, the film still had insufficient lubrication to serve as packaging film.

COMPARATIVE EXAMPLE 2

A heat-shrinkable, multilayer polypropylene biaxially stretched film was obtained in the same manner as in Example 2 except for adding the spherical silicone resin fine particles to both the innermost and the outermost layers in the same.

The thus-obtained heat-shrinkable, multilayer polypropylene biaxially stretched film showed a white line fold mark having been formed upon the unstretched raw sheet being passed between a pair of pinch rolls. The white line mark appeared quite unsightly when the film was used for heat-shrinkable packaging.

Microscopic survey of the film revealed that a population of about 800/mm² disk-like voids of about 10 to 20 μm in diameter existed in the portion corresponding to the outermost surface of the tubular sheet. On the opposite side thereof and the remaining portion, however, a population of only 30 to 60 /mm² voids were observed.

The multilayer biaxially stretched film of the present invention exhibits excellent properties as packaging film. For example, it serves to enhance the display of commercial products and to improve adaptability to packaging machines. It is particularly important in the packaging field utilizing heat shrinkage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A transparent tubular multilayer film comprising at least two, biaxially stretched tubular layers each formed of a polypropylene resin, wherein the innermost layer contains spherical non-porous antiblocking agent particles having an average particle size of 0.2 to 5 μm in an amount of 0.1 to 0.7% by weight, and the outermost layer is free of said spherical antiblocking agent particles.

2. A multilayer film as set forth in claim 1, wherein the innermost layer has a thickness of up to 50% based on the total thickness of the multilayer film.

3. A multilayer film as set forth in claim 1, wherein said antiblocking agent particles have a specific surface area of up to 120 m²/g.

4. A multilayer film as set forth in claim 1, wherein said antiblocking agent particles are silicone resin fine particles.

5. A multilayer film as set forth in claim 1, wherein said antiblocking agent particles are aluminosilicate particles.

6. A multilayer film as set forth in claim 5, wherein the aluminosilicate particles are surface-treated with a coupling agent.

7. A multilayer film as set forth in claim 1 and being a heat-shrinkable film.

8. A multilayer film as set forth in claim 1, wherein the polypropylene resin of each of said innermost and outermost layers is selected from the group consisting of propylene homopolymers, ethylene-propylene copolymers and ethylenepropylene-butene-1 terpolymers.

9. A multilayer film as set forth in claim 1, wherein an intermediate, core layer is provided between said innermost and outermost layers and is formed of a polymer selected from the group consisting of linear low density polyethylenes and saponified ethylene-vinyl acetate copolymers.

10. A multilayer film as set forth in claim 9, wherein two adhesive layer search formed of a propylene-butene-1 copolymer are provided between said innermost layer and said core layer and between said outermost layer and said core layer, respectively.

11. A process for manufacturing a transparent biaxially stretched multilayer film, which comprises extruding a multilayer tubular raw sheet wherein the innermost layer comprising a polypropylene resin has a thickness of up to 50% based on the total thickness of the tubular sheet and contains spherical, non-porous antiblocking agent particles having an average particle size of 0.2 to 5 82 m in an amount of 0.1 to 0.7% by weight and the outermost layer comprising a polypropylene resin does not contain said spherical, non-porous antiblocking agent particles, and subjecting the extruded multilayer tubular raw sheet taken up by a pair of pinch rolls to inflation biaxial stretching.

12. The process as set forth in claim 11, wherein said antiblocking agent particles have a specific surface area of up to 120 m²/g.

13. The process as set forth in claim 11, wherein said antiblocking agent particles are silicone resin fine particles.

14. The process as set forth in claim 11, wherein said antiblocking agent particles are inorganic fine particles.

15. The process as set forth in claim 14, wherein said inorganic fine particles are surface-treated with a coupling agent.

16. The process as set forth in claim 11, wherein said biaxially stretched multilayer film is heat-shrinkable.

17. The multilayer film of claim 1 wherein said particles have a sphericity 1.0 to 1.2, said sphericity being a ratio of A/B wherein A is the longest diameter of the spherical particle and B is the diameter transverse thereto, as viewed under an electron microscope.

18. The multilayer film of claim 11 wherein said intercoms layer additionally contains a porous, particulate, inorganic antiblocking agent.

19. The multilayer film of claim 11 wherein said outermost layer contains a porous, particulate, inorganic antiblocking agent.

20. A multi-layer film as set forth in claim 1 having a haze of no more than 3.7.

* * * * *

UNITED STATES PATENT AND TRADEMARK OFFICE
CERTIFICATE OF CORRECTION

PATENT NO. : 5,271,976
DATED : December 21, 1993
INVENTOR(S) : KONDO et al

It is certified that error appears in the above-indentified patent and that said Letters Patent is hereby corrected as shown below:

Col. 1, line 36, "be" should read --between--;

line 57, after "sheet" insert a comma --,--.

Col. 4, line 30, after "agents" insert a comma --,--;

line 57, after "stearic" delete the comma --,--.

Col. 5, line 7, begin a new, indented paragraph with "Lubricating".

Col. 8, line 5, "ethylenepropylene" should read --ethylene-propylene--;

line 13, delete "layers search" and insert --layers each--;

line 24, delete "82" and insert --$\mu$--;

UNITED STATES PATENT AND TRADEMARK OFFICE
CERTIFICATE OF CORRECTION

PATENT NO. : 5,271,976
DATED : December 21, 1993
INVENTOR(S) : KONDO et al

It is certified that error appears in the above-indentified patent and that said Letters Patent is hereby corrected as shown below:

line 48, delete "inter-";

line 49, delete "coms" insert --innermost--; and line 54, delete "1" insert --11--.

Signed and Sealed this

Thirtieth Day of August, 1994

BRUCE LEHMAN

Attest:

Attesting Officer

Commissioner of Patents and Trademarks